US008281608B2

(12) United States Patent  (10) Patent No.: US 8,281,608 B2
Kuehl et al.  (45) Date of Patent: Oct. 9, 2012

(54) TUBULAR CONDUIT

(75) Inventors: Steven J. Kuehl, Stevensville, MI (US);
Douglas D. Leclear, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 395 days.

(21) Appl. No.: 12/493,524

(22) Filed: Jun. 29, 2009

(65) Prior Publication Data
US 2010/0326113 A1 Dec. 30, 2010

(51) Int. Cl.
*F25D 23/12* (2006.01)
(52) U.S. Cl. .......................... 62/259.1; 62/338
(58) Field of Classification Search ............ 62/259.1, 62/338, 339, 440, 441, 398; 312/116, 401, 312/223.6; 138/114, 115
See application file for complete search history.

(56) References Cited

U.S. PATENT DOCUMENTS

| 650,987 | A |   | 6/1900  | Ostergren        |         |
|---------|---|---|---------|------------------|---------|
| 2,522,989 | A | * | 9/1950  | Carbary          | 439/31  |
| 2,665,414 | A | * | 1/1954  | Hubacker et al.  | 439/31  |
| 3,076,163 | A | * | 1/1963  | Nodge et al.     | 439/31  |
| 3,089,202 | A | * | 5/1963  | Pulaski          | 49/70   |
| 3,156,019 | A | * | 11/1964 | Dawley           | 49/70   |
| 3,429,140 | A | * | 2/1969  | White            | 62/339  |
| 4,543,800 | A | * | 10/1985 | Mawby et al.     | 62/339  |
| 4,683,944 | A |   | 8/1987  | Curlett          |         |
| 4,912,942 | A | * | 4/1990  | Katterhenry et al. | 62/338 |
| 5,044,445 | A |   | 9/1991  | Kayahara         |         |
| 5,225,632 | A |   | 7/1993  | Gorin et al.     |         |
| 5,248,196 | A | * | 9/1993  | Lynn et al.      | 312/406 |
| 5,263,509 | A | * | 11/1993 | Cherry et al.    | 137/343 |
| 5,359,795 | A |   | 11/1994 | Mawby et al.     |         |
| 5,787,724 | A | * | 8/1998  | Pohl et al.      | 62/389  |
| 5,941,619 | A | * | 8/1999  | Stieben et al.   | 312/223.6 |
| 6,182,453 | B1 | * | 2/2001  | Forsberg        | 62/125  |
| 6,812,407 | B1 | * | 11/2004 | Opperman         | 174/100 |
| 7,281,391 | B2 |   | 10/2007 | Marret et al.    |         |

* cited by examiner

*Primary Examiner* — Mohammad Ali
(74) *Attorney, Agent, or Firm* — Kirk W. Goodwin; Price Heneveld LLP

(57) ABSTRACT

The tubular conduit system of this invention allows modules requiring utilities to be positioned at any desired location within a cabinet, such as a refrigerator. The conduit is mounted to the cabinet of a refrigerator/freezer or the doors thereof and includes at least one electrical conductor positioned between the outer and inner walls and at least one fluid conduit within the inner wall. The conduit can be made of joined sections using connectors to also couple a module to the conduit such that modules can be installed at consumer selected locations prior to delivery of the refrigerator/freezer to the consumer.

20 Claims, 11 Drawing Sheets

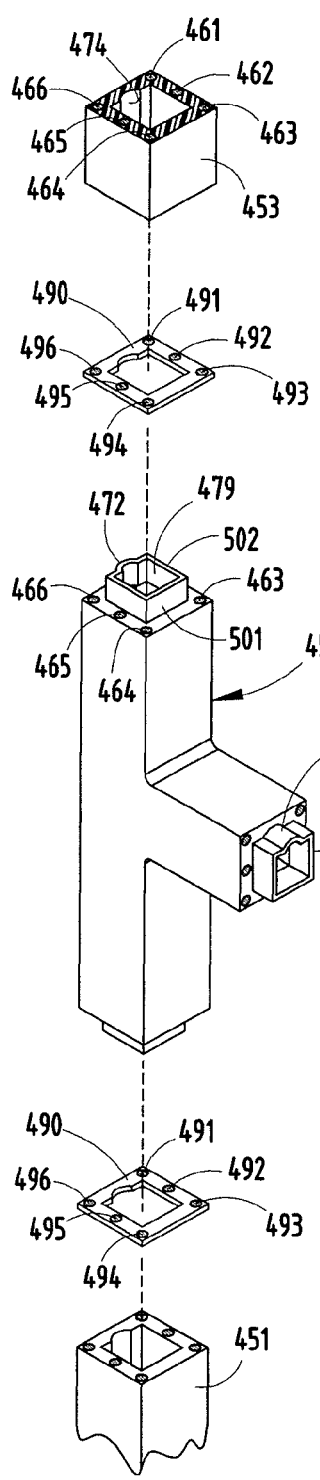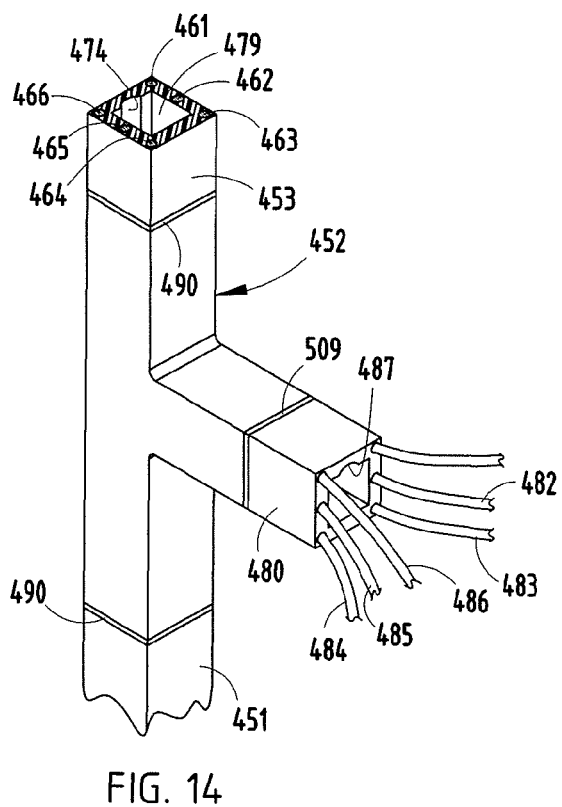
FIG. 13
FIG. 14

TUBULAR CONDUIT

BACKGROUND OF THE INVENTION

The present invention relates to a system for providing electrical and fluid utilities to a cabinet, such as a refrigerator cabinet, in which an extruded conduit integrally includes both electrical conductors and fluid conduits to which modules can be coupled for receiving such utilities.

SUMMARY OF THE INVENTION

The system of the present invention provides another mounting system for positioning modules requiring utilities at any desired location within a cabinet such as a refrigerator by incorporating a tubular conduit, which is mounted to the cabinet of a refrigerator/freezer or the doors thereof and at least one electrical conductor integrally formed in the conduit, which also integrally includes at least one fluid conduit. Modules can then be mounted to connect to the conduit at any desired location for receiving operating utilities.

This invention provides a conduit system for supplying utilities to one or more modules in a refrigerated cabinet. The system employs a tubular body having an outer wall and an inner wall. The body includes at least one electrical conductor positioned between the outer and inner walls and at least one fluid conduit within the inner wall.

In one embodiment, the conduit is made of joined sections using connectors to also couple a module to the conduit such that modules can be installed at consumer selected locations prior to delivery of the refrigerator/freezer to the consumer. Such systems, thereby, provide the manufacturer, a distribution center, or an installer with the capability of positioning a module requiring operating utilities at any desired location within a refrigerator/freezer cabinet and/or on the doors of the refrigerator/freezer.

These and other features, objects and advantages of the present invention will become apparent to those skilled in the art upon reading the following description thereof together with reference to the accompanying drawings.

BRIEF DESCRIPTION OF THE DRAWINGS

FIG. 13 is an exploded perspective view of sections of an yet another embodiment of the conduit and a T-shaped connector;

FIG. 14 is a perspective view of the assembled structure of FIG. 13

DETAILED DESCRIPTION OF THE PREFERRED EMBODIMENT

New refrigerator designs are incorporating flexible design concepts allowing the consumer to select different features. Some of the features include, for example, module components such as disclosed in patent application Ser. No. 12/402,559 entitled VACUUM FOOD PRESERVATION SYSTEM; Ser. No. 12/402,747 entitled CHILLING AND THAWING MODULAR APPLIANCE SYSTEM; and Ser. No. 12/402,731 entitled MODULAR DOOR MOUNTED CLIMATE CONTROLLED MEDICINE COMPARTMENT, all of which were filed on Mar. 12, 2009 These and other modules require utilities in the form of electrical operating power, data signals, fluids in either liquid or gaseous form, or the like, for their operation. The disclosures of these applications are incorporated herein by reference. U.S. patent application Ser. No. 12/402,644, filed Mar. 12, 2009, entitled REFRIGERATOR WITH MODULE RECEIVING CONDUITS discloses a modular system in which utilities are supplied by separate fluid and electrical conduits which are molded into the refrigerator cabinet and which have specific outlets at discreet locations to allow modules to be installed therein at incremental locations where such outlets exist. The disclosure of this application is incorporated herein by reference.

A mounting system providing a continuous mounting spine for selective positioning modules anywhere along the spine is disclosed in U.S. patent application Ser. No. 12/469,915, filed May 21, 2009, and entitled REFRIGERATOR MODULE MOUNTING SYSTEM, which is assigned to the present assignee, and the disclosure of which is incorporated herein by reference. Also, U.S. patent application Ser. No. 12/469,968, filed May 21, 2009, and entitled MULTIPLE UTILITY RIBBON CABLE discloses a ribbon-like cable which also allows the selective positioning of modules anywhere along the cable. The disclosure of this application is also incorporated herein by reference.

Figure 1:
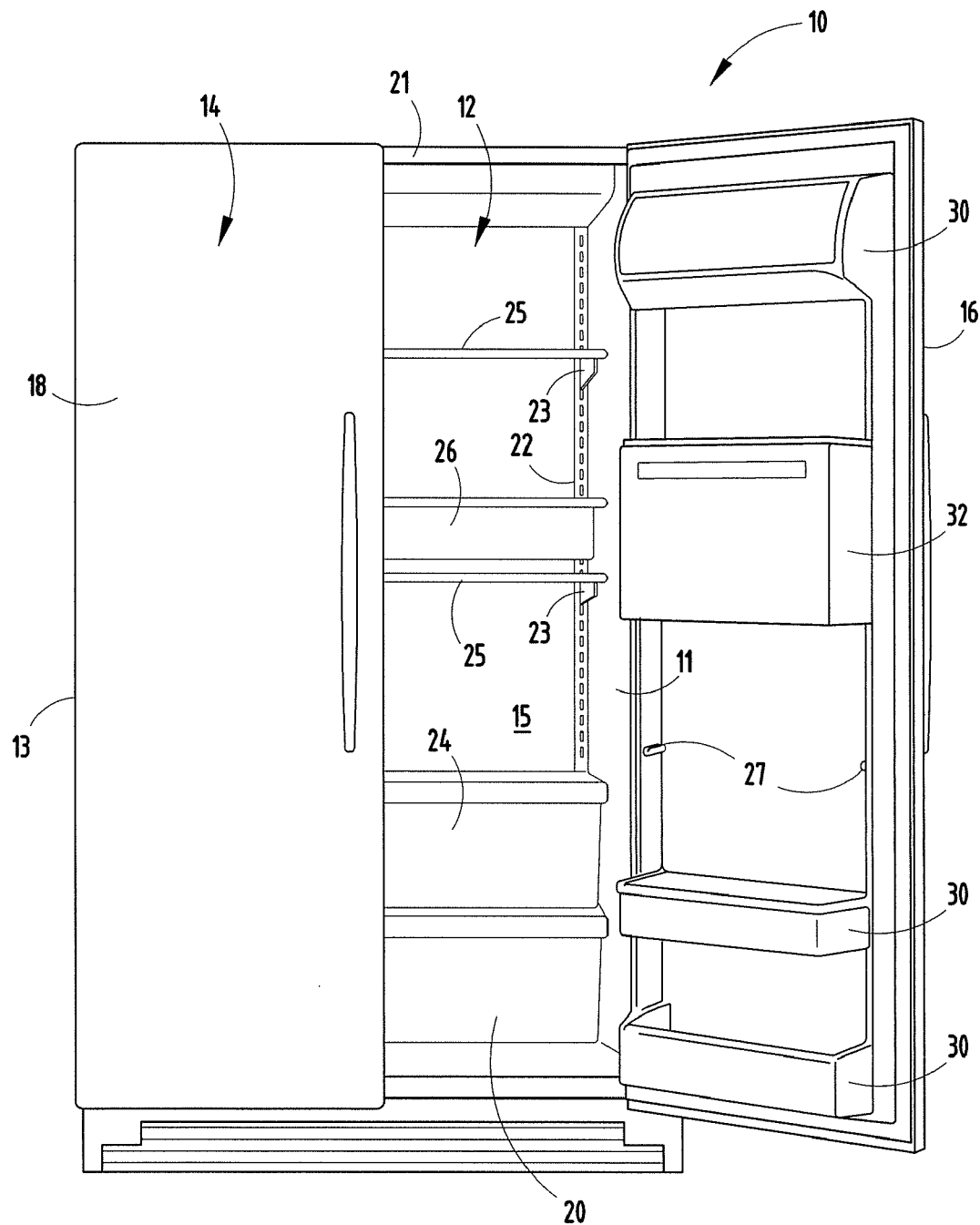
FIG. 1 is front elevational view of a refrigerator/freezer embodying the present invention.

Referring initially to FIG. 1, there is shown a refrigerator/freezer 10 embodying the present invention, which includes a side-by-side refrigerator cabinet 12 and freezer cabinet 14. Each of the cabinets 12 and 14 include side walls 11 and 13, respectively, and a rear wall 15. Refrigerator 10 also includes a closure door 16 for the refrigerator cabinet 12, which is hinged to cabinet 12, and a freezer door 18, also hinged to the freezer cabinet 14. Both doors 16 and 18 include suitable seals for providing an airtight, thermally insulated sealed connection between the doors and the respective cabinets.

Refrigerator 10 is adapted to receive a variety of shelves and modules, as described below, at different positions defined by, in the embodiment shown in FIG. 1, a plurality of horizontally spaced vertically extending slotted rails 22 extending from the rear wall 15 of the refrigerator and freezer compartments. In the embodiment shown the supports are in the form of vertically extending rails with vertically spaced slots for receiving mounting tabs on the shelf supports 23 and modules for attaching them in a cantilevered fashion to the cabinets at selected incrementally located locations. The inside edges of doors 16 and 18 include vertically spaced shelf supports 27 for positioning bins and modules in the doors. The shelves, modules, and bins can thus be located at a variety of selected locations within the cabinets 12 and 14 and the doors 16 and 18 and receive operating utilities using the conduit system of the present invention.

The refrigerator 10 includes a variety of shelves and modules, some of which require utilities, such as electrical operating power, data signal transmission with respect to temperature and humidity control information, coolant fluids and the like. Thus, for example, as seen in FIG. 1, refrigerator cabinet 12 includes a powered crisper module 20 which is coupled to a utility conduit embodying the present invention as described below, a conventional passive crisper module 24, a shelf-mounted module 26, which can be, for example, an instant chill or instant thaw module, and conventional shelves 25 at spaced locations within the refrigerator. The door 16 may also include a variety of conventional bins 30, as well as a powered module 32 which could include a chilled water dispenser, an instant thaw module, an instant chill module, or any of a variety of modules such as described in the above-identified patent applications. In order to provide utilities, such as electrical operating power or data signals, cooled or warmed air, or liquids to the modules, such as modules 20, 26, and 32, and modules in the freezer section 14 as well, the conduit assembly 50, shown in FIGS. 2-4, is employed to supply such utilities.

Figure 2:
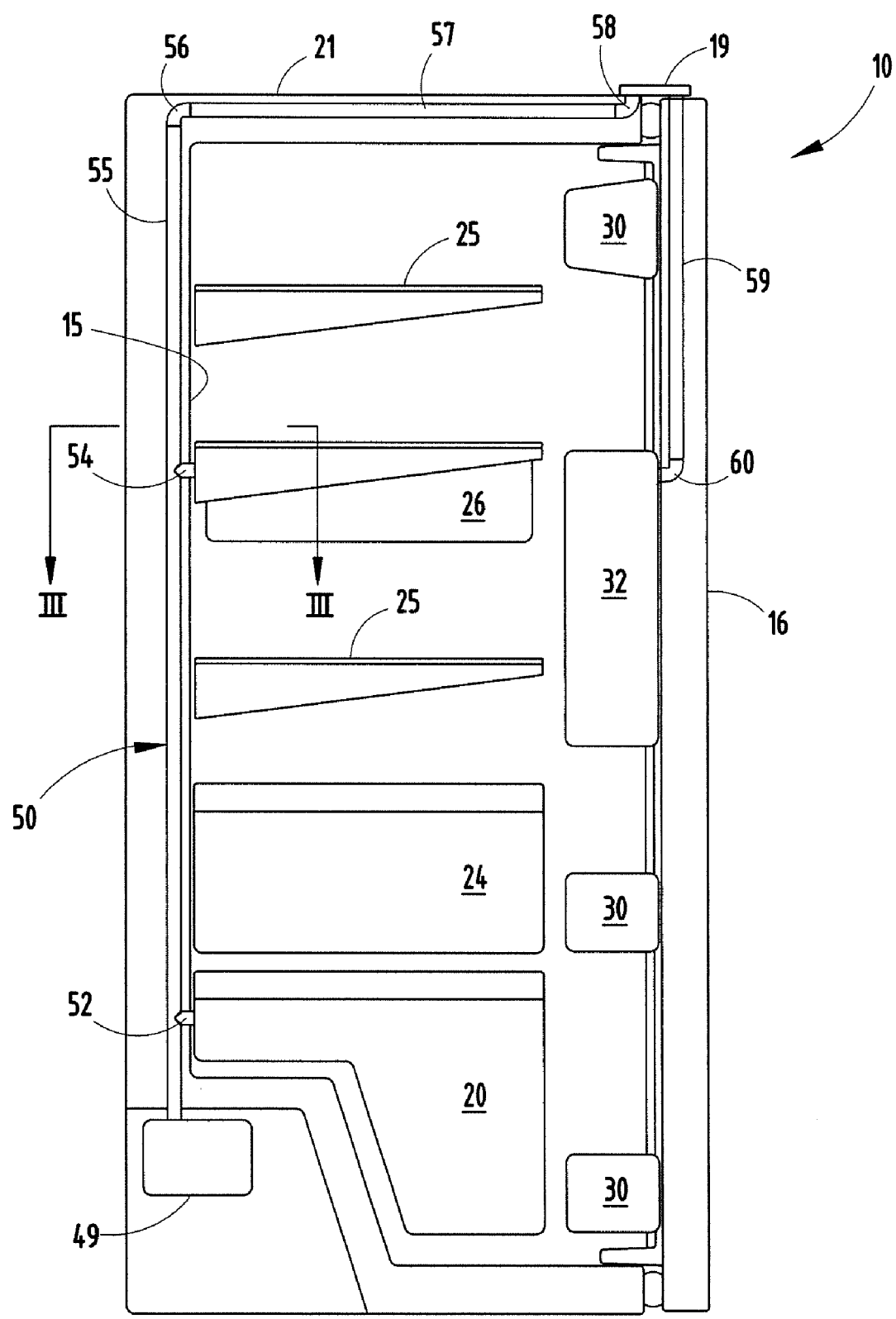
FIG. 2 is a vertical schematic cross-sectional view of the refrigerator shown in FIG. 1 illustrating the mounting of a conduit and connectors for coupling modules to the conduit.

In FIG. 2, there is shown schematically a source 49 of, for example, fluid, gas, electrical operating power, or electrical signals which are to be distributed to the modules within the refrigerator by the conduit system 50. Conduit system 50 comprises several sections of conduits which can be circular, as shown in FIGS. 2-8, or take on other tubular configurations, as shown in FIGS. 9-14. In some embodiments, the conduit system 50 may be continuous and integrally curved to reach desired areas of the refrigerated cabinet. The conduit system, as seen in FIGS. 2 and 4, includes a first section 51 coupled to a T-shaped connector 52, in turn, coupled to a second, longer section 53. The T-shaped connector 52 couples to module 20, as described below. The length of section 51 is selected to position the T-shaped connector 52 in an appropriate position for coupling to module 20. Similarly, the length of section 53 is selected such that another T-shaped connector 54 will align with module 26 to provide utilities thereto. A third section 55 extends upward toward the top of the refrigerator, as seen in FIG. 2, and an elbow connector 56 extends the utilities across the top of the refrigerator through a conduit 57 to a second elbow 58. Elbow 58 supplies the utilities through the door hinge 19 of refrigerator 10 using a flex coupling made of a thermoplastic rubber or other elastomer such as Santoprene® with suitable seals and conductors and conduits which mate with conductors contained within the conduit system 50. The flexible coupling is coupled to a downwardly depending conduit 59 with an elbow 60 positioned to couple to powered module 32 in the door. One skilled in the art will appreciate that, in other embodiments, the downwardly depending conduit 59 may have other orientations, other than downward, with respect to the flexible coupling.

Figure 3:
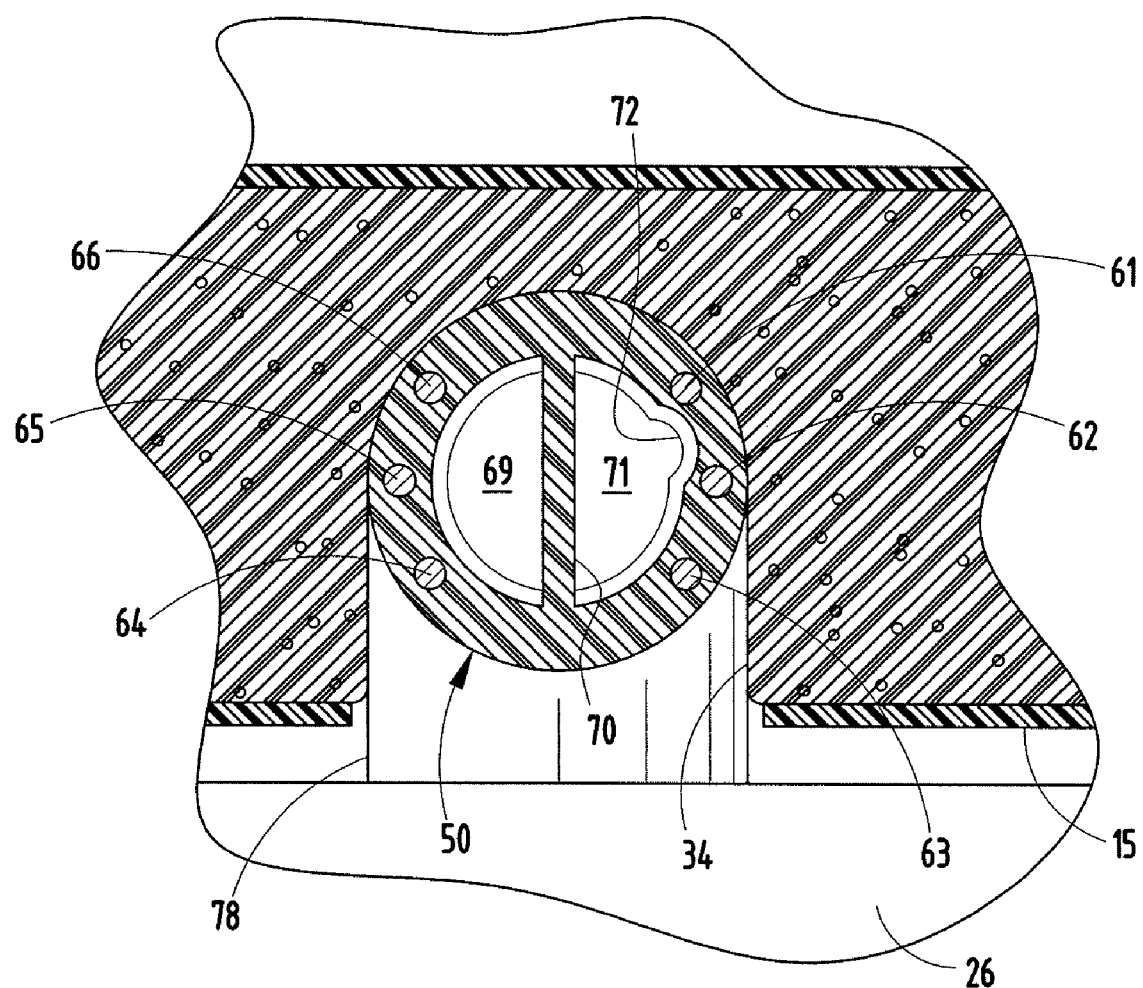
FIG. 3 is an enlarged fragmentary cross-sectional view of the conduit and connector to a module taken along section line III-III in FIG. 2.
Figure 4:
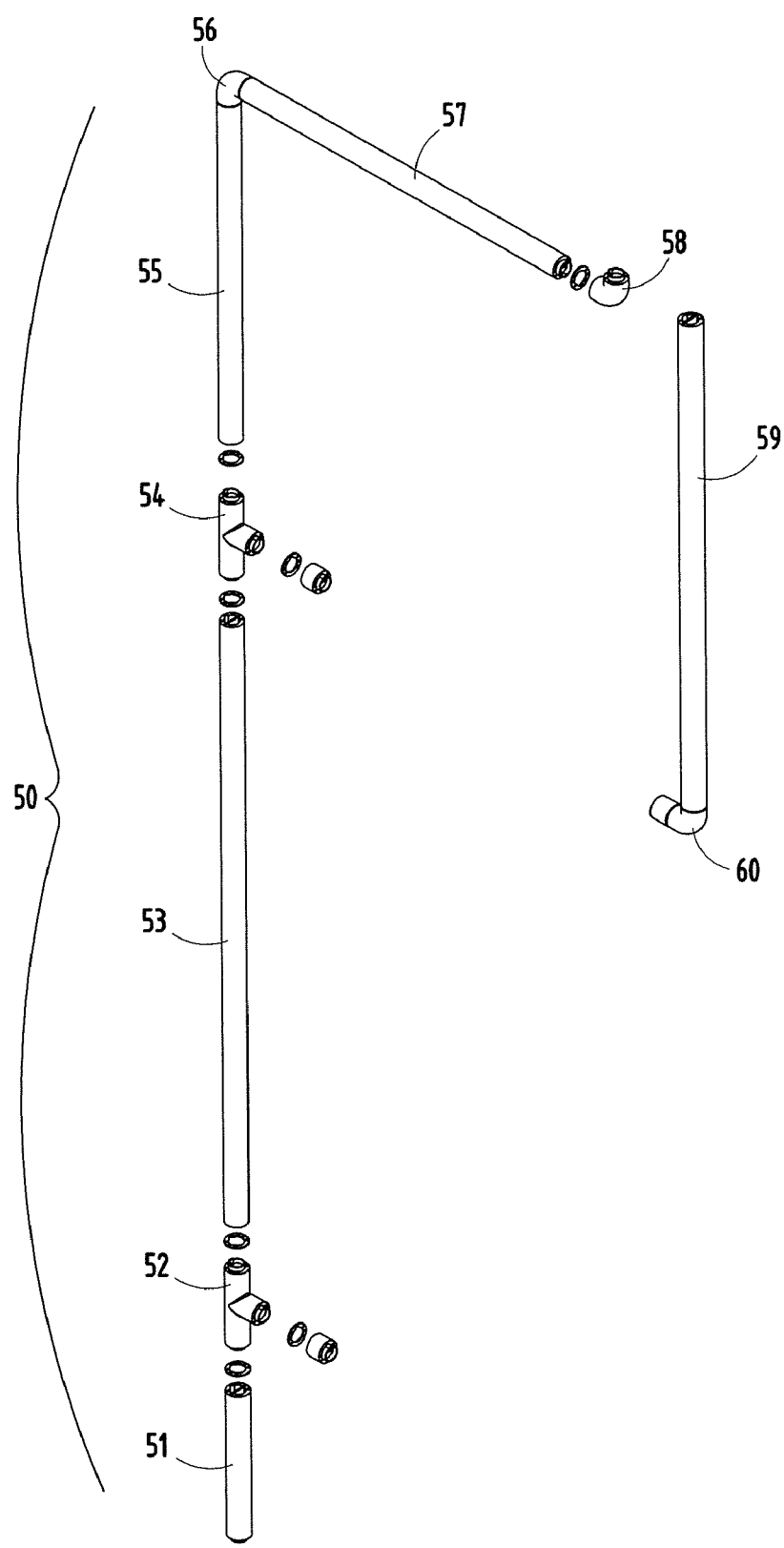
FIG. 4 is an exploded perspective view of the conduit system shown in FIG. 2 shown removed from the refrigerator.

In one embodiment, the conduit system is recessed within the liner 17 of the refrigerator in a trough 34, as seen in FIG. 3, for receiving the conduit system 50 in the back wall 15 of the refrigerator, as well as the top 21 and inside of the door. In some embodiments, the trough 34 is covered by a cap in areas where there is no connection to a module, such that it is not exposed. By providing different sections, such as sections 51, 53, 55, 57 and 59 of the conduit system 50, the lengths can be selected for a given installation, and the conduits formed as described below, can be cut and joined for a given refrigerator installation.

The conduit sections, elbows, and tees are preferably extruded of a polymeric material, such as polyethylene, polyvinylchloride, polypropylene, polyurethane, or polystyrene. During the extruding process, they are coextruded with electrical conductors, such as conductors 61 through 66. This embeds the conductors between the outer and inner surfaces of the tubular wall forming the conduit. The tubular form of conduit sections 51-59 can be circular, as shown in FIGS. 3-8, and either have a hollow central fluid pathway 68 (FIGS. 7 and 8) or may include an integral partition 70 to divide the fluid transmitting pathway 68 into two passageways 69 and 71, as seen in FIGS. 3, 5, and 6.

Figures 5, 6:
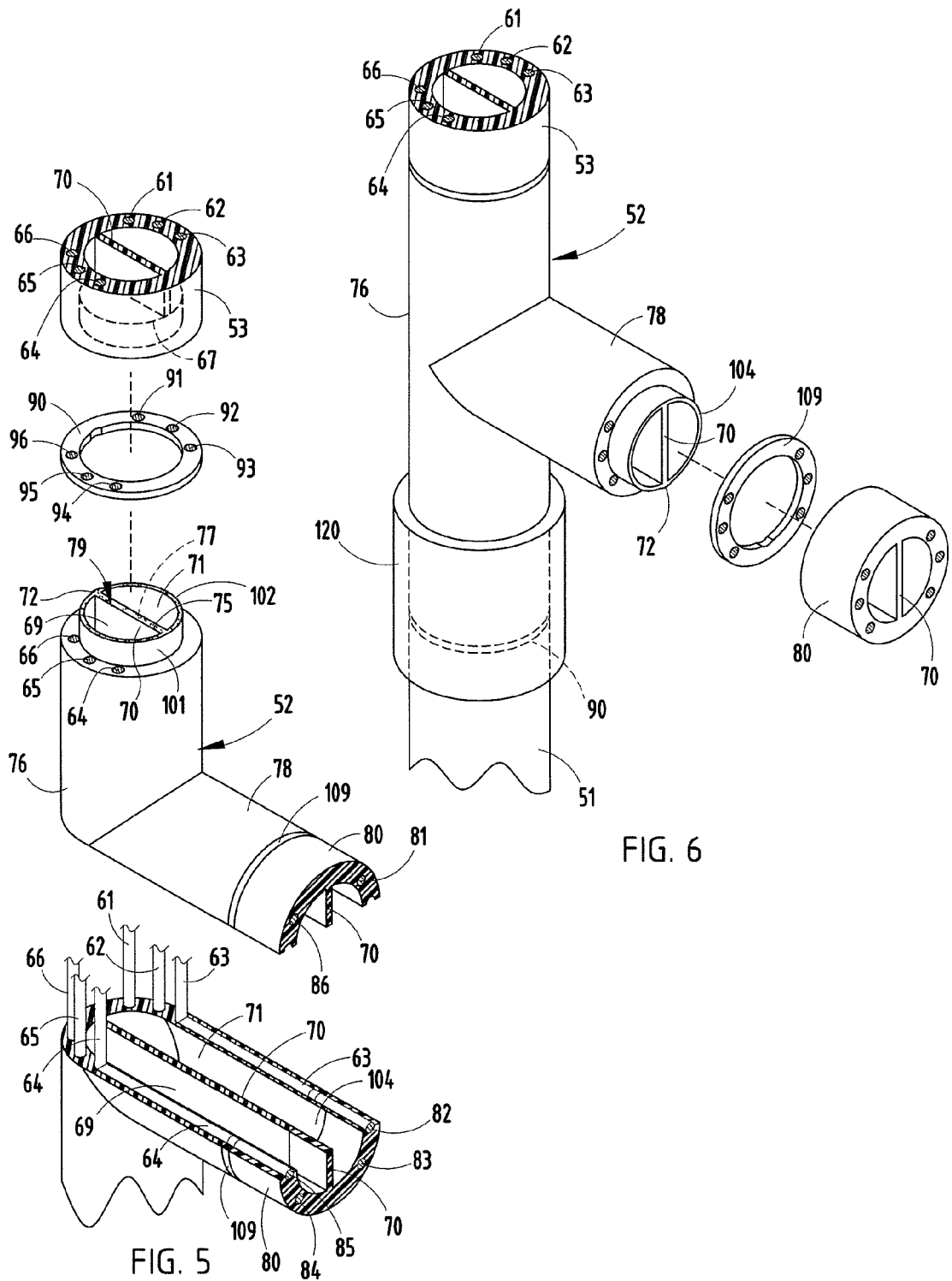
FIG. 5 is an enlarged exploded fragmentary, partly broken away, cross-sectional view of a conduit section and a connector for coupling the conduit to a module.
FIG. 6 is an assembled view of the structure shown in FIG. 5.
Figures 7, 8:
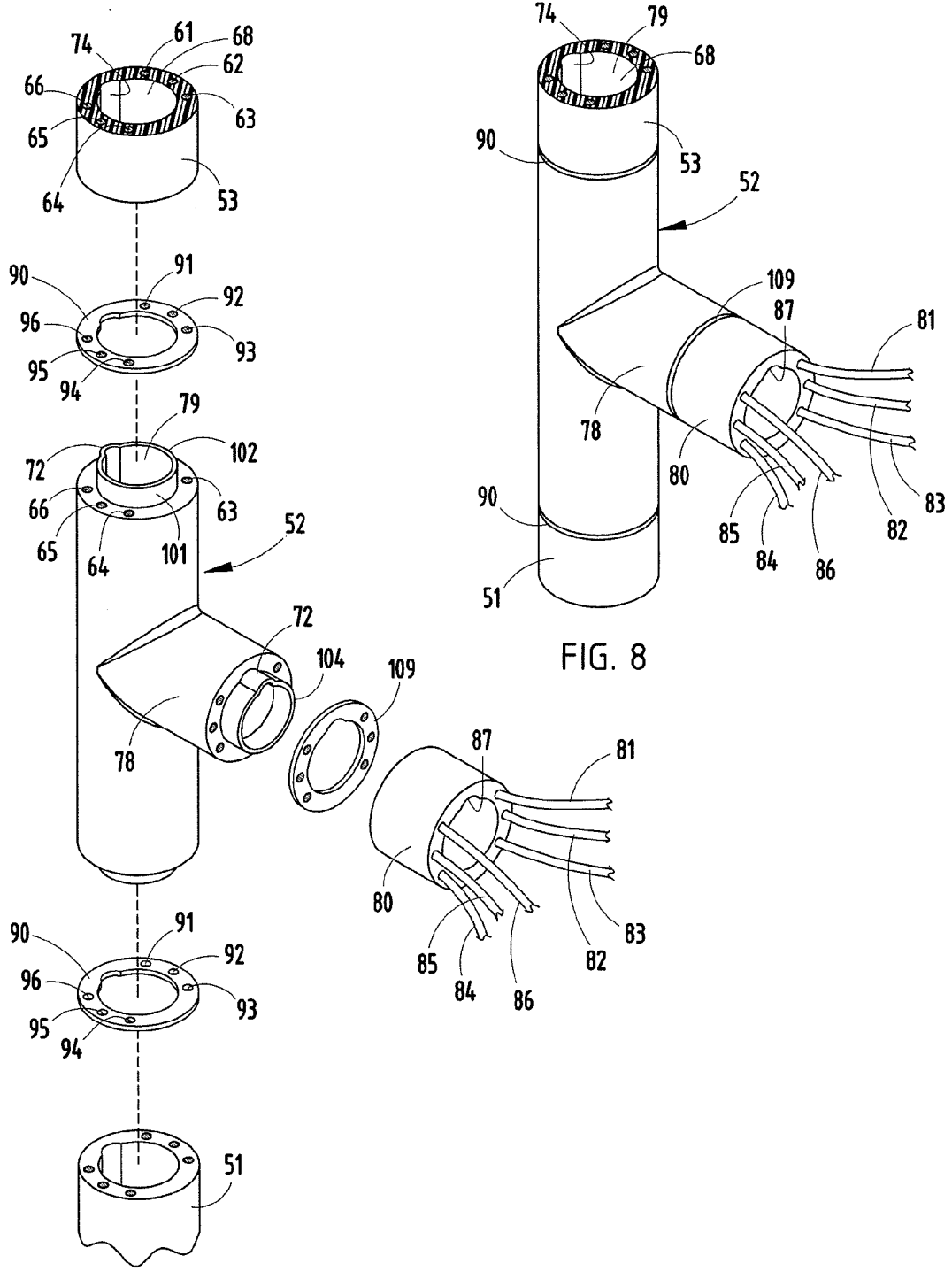
FIG. 7 is an exploded perspective view of sections of an alternate embodiment of a conduit and a T-shaped connector.
FIG. 8 is a perspective view of the assembled structure of FIG. 7.

The conduits and connectors include a mating keyway 72, which can be in the form of a curvilinear bump or the like which aligns the conductors on the fittings, such as T-connector 52 shown in FIGS. 5 and 7. The conduits include a mating recess, such as 74 (FIGS. 7 and 8), to align the connectors with the conduit sections. The connectors, such as connector 52 shown in FIG. 5, are molded with in situ conductors 61-66 and may include a greater or fewer number of conductors to supply modules. The connectors, such as T-connectors 52 and elbows 56, 58, and 60, can be molded with insert-molded conductors, such as conductors 61-66 shown in FIG. 5, to provide, for a given module, the number of conductors and location necessary for the particular module. Alternatively, universal connectors and conduits can be made with a predetermined number of conductors which can be used or not used as required by a particular module. Such insert-molded structures can be commercially manufactured by companies such as Molex Incorporated. T-shaped connector 52, shown in FIGS. 5 and 6, includes a central section 76 and a leg 78 which extends from the aligned conduit sections 51, 53 outwardly toward a module, such as module 20, which includes a connector 80 similarly keyed to leg 78, as best seen in FIG. 6.

In order to provide a sealed connection between the various connectors and the conduit sections, a sealing gasket 90 is provided at each interface, which gasket is made of a suitable compressible, solvent resistive, dielectric, resilient polymeric material (i.e., polyurethane) and which includes conductive pads 91-96 corresponding to and aligned with conductors 61-66 to couple the electrical operating power or signals through the joint between the coupling, such as connector 52, and the conduits 51, 53. The pads 91-96 may be disks of conductive material insert-molded in gasket 90 and/or may include a conductive adhesive. The gasket material is such that, when compressed during assembly with a mating part, the polymeric locally flows to fill gaps, thus providing a seal against fluid flow about the electrical conductors. Similarly, each of the module, such as module 20, will include a connector 80 coupled by gasket 109 to the extending leg 78 of connector 52 to couple the module to the conduit system 50. The connector 80 may include integral wires, such as 81-86 (FIGS. 7 and 8), corresponding to conductors 61-66. The conduit assembly 50 will have a greater or fewer number of conductors depending upon the module requirements. As seen in FIGS. 7 and 8, the connector 80 likewise includes a keyway, such as keyway curved slot 87, which interfaces with the key 72 on connector 52 to align the module conductors with the utility supplying conductors. Connecter 52, shown in FIGS. 4-6, includes a central fluid passageway 79 which is divided by partition 70 into two passageways 69 and 71 also formed in the conduits. In some designs, the passageway 79 will not be partitioned, such as shown in FIGS. 7 and 8, and communicate directly with the fluid supply in the conduit system to supply a single fluid to a module as required.

With the embodiment shown in FIGS. 5 and 6, the partition 70 and similar partitions in the remaining conduit system 50 allow two fluid paths to be supplied to modules. Although partition 70 is shown dividing passageway 79 in half, the partition can extend along any chord on the walls of a tubular conduit to provide unequal sized passageways. Also, more than one partition can be provided to divide the fluid carrying conduit elements in multiple sections.

In order to sealably couple the connectors and conduits, such as connector 52 to both the conduits 51 and 53, and the module connector 80 extending from a module, they include a collar, such as collars 102 and 104, which include the key 72 for aligning a connector to a conduit or other connector. The elbows likewise include such mating structure. The outer surfaces 101 of the collar fit within the conduit, as illustrated in FIG. 6 and receive a bonding adhesive, such as a solvent-based adhesive for bonding the sections together while being held in compression to compress gaskets 90 for making a fluid tight connection, as well as electrical connection through the conductive pads 91-96. If necessary or desired, an outer collar 120, such as shown in FIG. 6, can also be used to provide an additional mechanical connection to the junction between a conduit and a connector or the connector and the module.

The mating elements, such as conduit section 53 shown in FIG. 5, will include an undercut recess, such as 67, to nestably receive a collar 102. Likewise, partition 70 in a conduit section will terminate at the end of recess 67 such that the surfaces of adjacent partitions will abut when assembled. The surface 75 of the partition ends are coated with a polymeric sealing adhesive 77. Gaskets, such as gaskets 90 and 109, fit over collar 102 to engage the ends of the conductors. Each of the connectors and conduit sections have a similar structure for fluid sealing them to each other and electrically coupling aligned conductors.

Figures 9, 10:
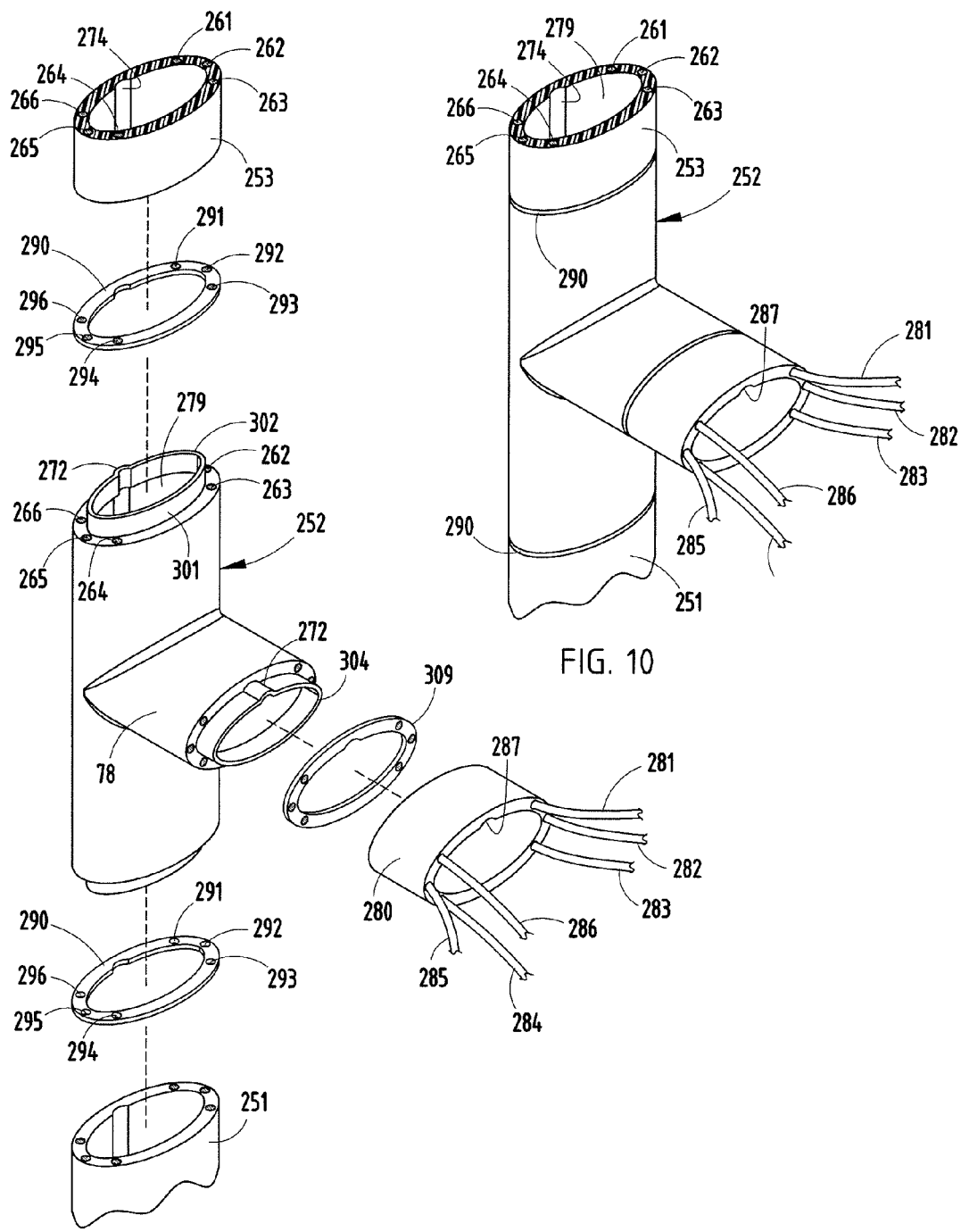
FIG. 9 is an exploded perspective view of sections of an alternative embodiment of the conduit and a T-shaped connector.
FIG. 10 is a perspective view of the assembled structure of FIG. 9.
Figures 11, 12:
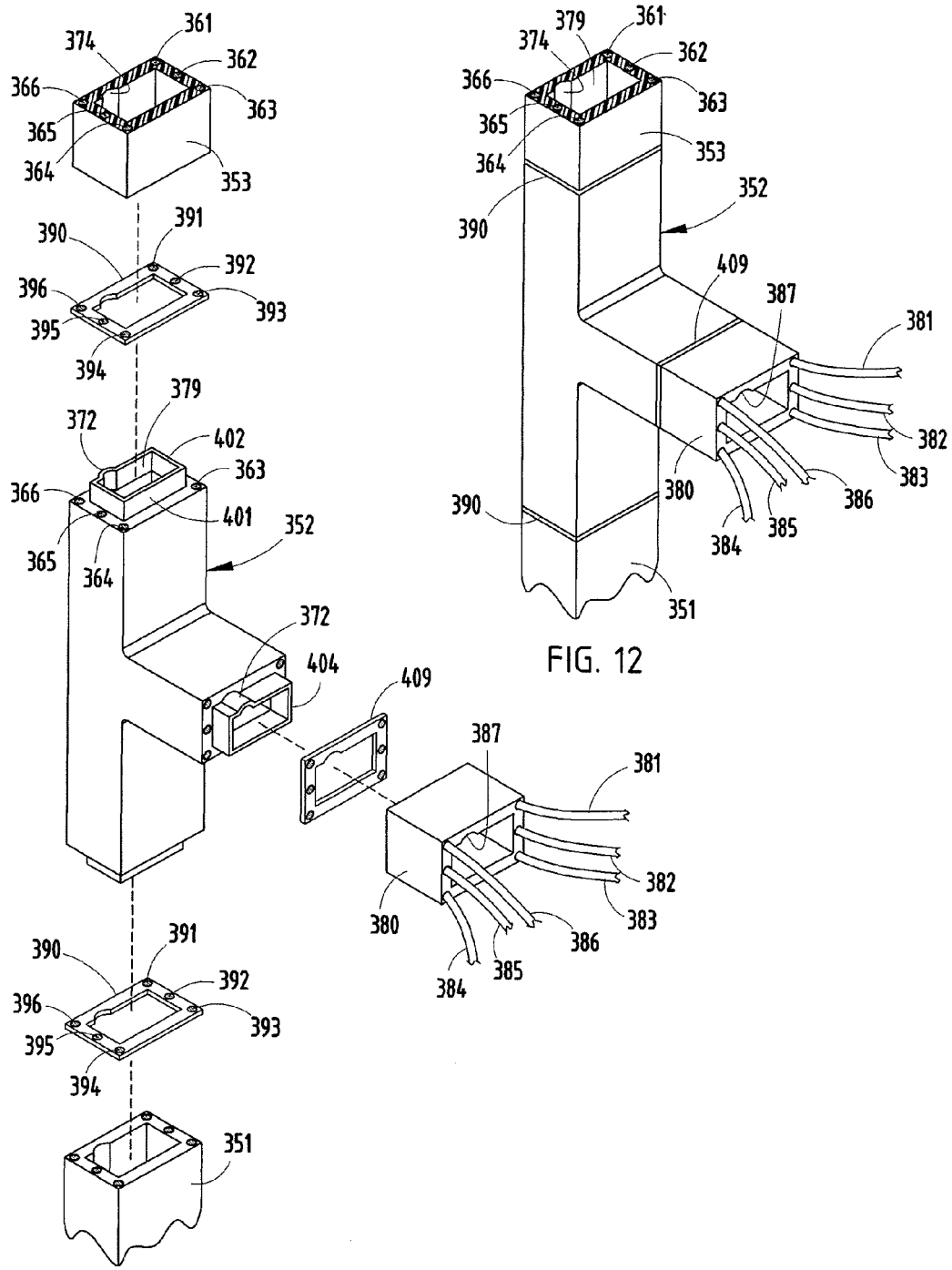
FIG. 11 is an exploded perspective view of sections of an another embodiment of the conduit and a T-shaped connector.
FIG. 12 is a perspective view of the assembled structure of FIG. 11.

Instead of the circular connectors and conduits shown in FIGS. 3-8, the tubular connectors and conduits can take on a variety of shapes, including the oval shape shown in FIGS. 9 and 10, a rectangular shape as shown in FIGS. 11 and 12, or a square tubular shape as shown in FIGS. 13 and 14. In each of these figures, the component parts are the same as shown in FIGS. 5-8 and are identified by the prefix "2" in FIGS. 9 and 10; "3" in FIGS. 11 and 12; and "4" in FIGS. 13 and 14. By providing different tubular shapes, a greater or fewer number of electrical conductors and/or fluid flow paths may be provided without being confined to the cylindrical shape described in the first embodiment.

In addition to supplying the internal module, such as modules 20, 26, and 32 shown in FIGS. 1 and 2, the conduit assembly 50 can be extended to provide operating utilities to external modules, such as module 33, mounted to the front side of door 16 and coupled to conduit 59 by a T-connector 35, which can be the same construction as the other T-connectors, such as 52 shown in FIGS. 4-6 herein. Module 33 can be any one of a variety of convenient accessories for the refrigerator, such as an auxiliary cooling compartment for soda or the like, which has its own door, allowing access to chilled product without opening the main refrigerator door 16, thereby saving energy. The module likewise can take any other of the module characteristics as discussed in the background of this invention, which provides the consumer with flexibility of additional features for the refrigerator/freezer.

Figure 15:
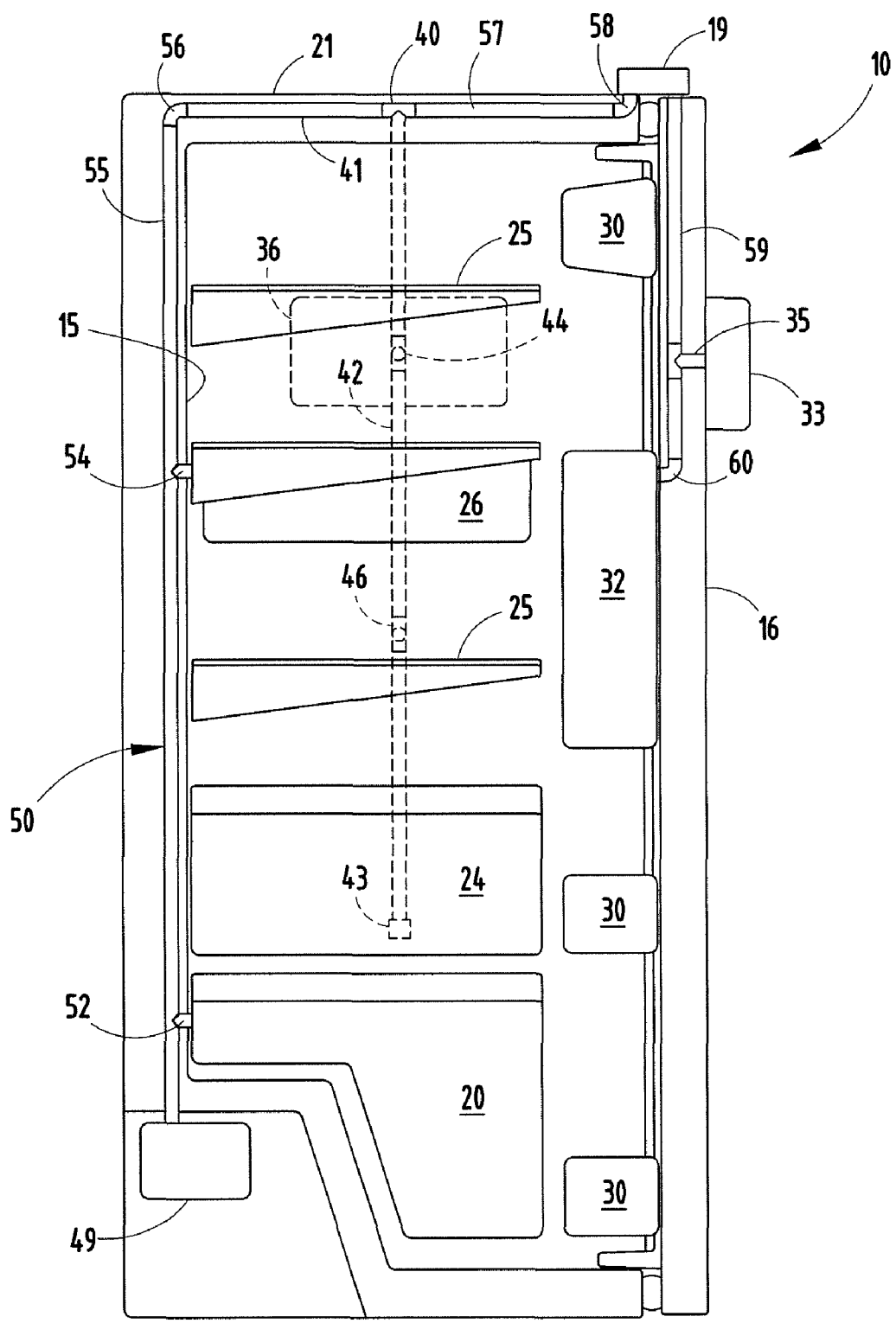
FIG. 15 is a vertical schematic cross-sectional view of an alternative embodiment of the refrigerator shown in FIGS. 1 and 2, illustrating the mounting of a conduit and connectors for coupling external modules to the conduit.
Figure 16:
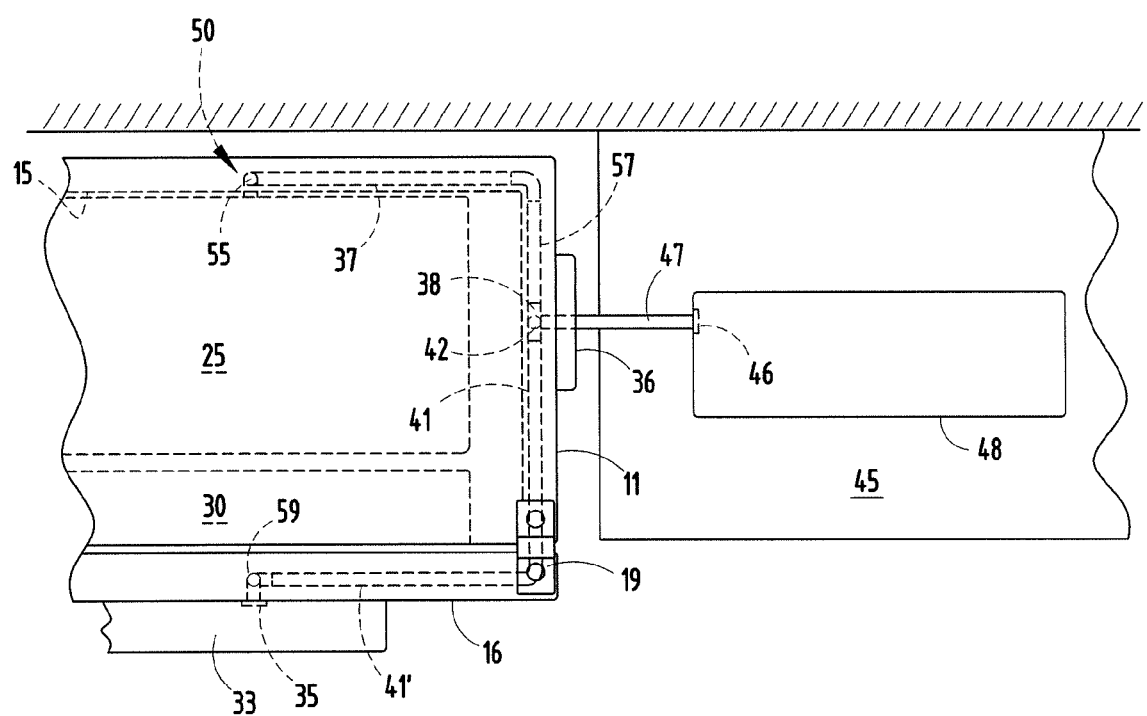
FIG. 16 is a top plan schematic view of the alternative embodiment shown in FIG. 15.

In addition to an externally mounted module 33 which can be mounted to the door, the conduit assembly 50 can be extended to either side of the refrigerator for mounting modules, such as a module 36, to the side of the refrigerator, as seen in FIGS. 15 and 16, when the refrigerator is installed in an environment in which access to either of the sides is available to the consumer. For such purpose, the conduit 55 is extended to the side by conduit sections 37, 41, and 41' coupled by elbows of similar construction to elbows such as 58 as described above. The utilities supplied through conduits 37, 41, and 41' can be extended downwardly by a conduit section 42 through a T-connector 40 (FIG. 15). The downwardly depending conduit 42 (FIG. 15) can be sealed at its lower end by a cap 43 to terminate the utility service in conduit section 42. The downwardly depending conduit section 42 is mounted to the inside of the right side wall 13 of the refrigerator cabinet in a manner which is the same as illustrated by trough 34 in FIG. 3.

Other T-shaped connectors, such as connector 44 (FIG. 15), can supply the utilities from the conduit assembly 50, including downwardly depending side conduit 42, to external modules, such as module 36, or through a second T-shaped connector 46 (FIG. 15) and conduit section 47 to an additional module 48 which rests upon a countertop 45 of a kitchen adjacent the refrigerator 10. Modules 33, 36, and 48 utilize connectors, such as connector 46 shown in FIG. 16, of the same construction as connectors 80 shown in FIGS. 7 and 8 and described above to couple their respective feed conduits. The height of the laterally extending conduit section 47 is positioned by the placement of connector 46 (FIG. 15) to be the appropriate height for the countertop 45 and the module 48 receiving utilities through conduit section 47. Module 48 can be a supplemental chiller, such as a wine or soda cooler, an instant chill or instant thaw unit, or other types of modules as discussed in the background of this invention. Any of the conduit geometries disclosed can be used.

Thus, with the system of the present invention, a tubular conduit system is provided with the flexibility of providing conduit sections of different lengths with connectors which mate with internal or external modules requiring utilities, such as liquids, gases, electrical operating power, or data signals.

It will become apparent to those skilled in the art that various modifications to the preferred embodiments of the invention as described herein can be made without departing from the spirit or scope of the invention as defined by the appended claims.

The invention claimed is:

1. An elongated conduit for supplying both fluid and electrical utilities within a refrigerated cabinet comprising:
   an elongated tubular body having a wall with an outer surface and an inner surface;
   at least one electrical conductor embedded in said wall between said outer and inner surfaces;
   at least one fluid conduit within said inner surface of said wall; and
   wherein said tubular body extends a length of the cabinet sufficient to provide fluid in contact with said inner surface of said wall directly from said conduit in said elongated tubular body to at least one section of the cabinet.

2. The conduit as defined in claim 1 wherein said elongated tubular body is extruded and said conductor is co-extruded within said wall.

3. The conduit as defined in claim 2 wherein said body is made of one of polyethylene, polyvinylchloride, polypropylene, polyurethane, and polystyrene.

4. The conduit as defined in claim 1 wherein said conduit is an elbow.

5. The conduit as defined in claim 1 wherein said conduit has a plurality of sections and wherein each section has ends, and wherein said ends of adjacent sections are joined to one another by a connector.

6. A conduit for supplying utilities to a refrigerated cabinet comprising:
   a tubular body having an outer wall and an inner wall;
   at least one electrical conductor positioned between said outer and inner walls; and
   at least one fluid conduit within said inner wall, wherein said conduit includes at least one dividing wall extending across said inner wall to define at least two fluid conduits.

7. A conduit for supplying utilities to a refrigerated cabinet comprising:
   a tubular body having an outer wall and an inner wall;
   at least one electrical conductor positioned between said outer and inner walls; and
   at least one fluid conduit within said inner wall, wherein said conduit has a plurality of sections and wherein each section has ends, and wherein said ends of adjacent sections are joined to one another by a connector, and wherein said connector includes a conductive pad aligned with conductors in said conduit sections.

8. A conduit for supplying utilities to a refrigerated cabinet having inner and outer walls, said conduit comprising:
   an elongated generally cylindrical body for coupling between the walls of a refrigerated cabinet, said body including a conduit wall having an inner surface and an outer surface;
   at least one electrical conductor embedded in said conduit wall between said inner and outer surfaces and at least one fluid conduit in the space within said inner surface of said wall; and
   wherein said conductor is coupled to a source of electrical signals and said conduit is coupled to a fluid source for supplying a fluid directly from said inner surface of said conduit to a section of the refrigerated cabinet.

9. The conduit as defined in claim 8 wherein said fluid conduit is coupled to a supply of cold air for supplying cold air to the refrigerated cabinet.

10. The conduit as defined in claim 8 wherein said fluid conduit is coupled to a supply of water for supplying water to the refrigerated cabinet.

11. The conduit as defined in claim 8 and further including at least one module in the refrigerated cabinet and including a connector coupled to said body and communicating with said electrical conductor or fluid conduit for providing power or data between said module and said body and a fluid between said module and said body.

12. The conduit as defined in claim 8 and further including at least one module positioned outside of the refrigerated cabinet and including a connector coupled to said body and communicating with said electrical conductor or fluid conduit for providing power or data between said module and said body and a fluid between said module and said body.

13. A refrigerated compartment comprising:
   a cabinet having walls and an access door;
   a module mounting structure supported within said cabinet;
   an elongated tubular polymeric conduit mounted within said cabinet and extending substantially the entire length of said cabinet, said conduit positioned within said walls of said cabinet integrally including a wall having an inner surface and an outer surface, at least one electrical conductor embedded within said wall between said inner and outer surfaces, and at least one fluid conduit within the inner surface of said wall of said conduit for conducting a fluid in contact with said inner surface;
   at least one module for mounting to said mounting structure; and
   a connector for coupling said module to said conduit for transferring operating power, data, or fluids between said conduit and said module.

14. The refrigerated compartment as defined in claim 13 wherein said conduit includes a dividing wall defining a plurality of fluid conduits.

15. The refrigerated compartment as defined in claim 13 wherein the mounting structure is on the access door.

16. A refrigerator including a refrigerated cabinet comprising:
   a tubular conduit for supplying utilities to a module associated with said cabinet, wherein said conduit extends within said cabinet and includes at least one section extending outside of said cabinet;
   said tubular conduit having a wall with an outer surface and an inner surface, at least one electrical conductor embedded in said wall between said outer and inner surface, said conduit conducting at least one fluid directly within and in contact with said inner surface of said wall;
   wherein said conductor is coupled to a source of at least one of electrical power or electrical signals and said fluid conduit is coupled to a fluid source; and
   at least one module positioned outside of said refrigerated cabinet and including a connector coupled to said section of said tubular conduit extending outside of said cabinet and communicating with said electrical conductor or fluid conduit for providing power or data between said module and said tubular conduit and a fluid between said module and said tubular conduit.

17. The refrigerator as defined in claim 16 wherein said module is positioned on a countertop adjacent said refrigerator.

18. The refrigerator as defined in claim 17 wherein said tubular conduit is one of cylindrical, rectangular and square in cross-section.

19. A refrigerator including a refrigerated cabinet comprising:
   a tubular conduit for supplying utilities to a module associated with said cabinet, wherein said conduit extends within said cabinet and includes at least one section extending outside of said cabinet, wherein said tubular conduit is one of cylindrical, rectangular and square in cross-section, and wherein said tubular conduit includes at least one dividing wall to define at least two fluid pathways;
   at least one electrical conductor and at least one fluid conduit integrally formed in parallel spaced relationship in said tubular conduit;
   wherein said conductor is coupled to a source of at least one of electrical power or electrical signals and said fluid conduit is coupled to a fluid source; and
   at least one module positioned outside of said refrigerated cabinet and including a connector coupled to said section of said tubular conduit extending outside of said cabinet and communicating with said electrical conductor or fluid conduit for providing power or data between said module and said tubular conduit and a fluid between said module and said tubular conduit, wherein said module is positioned on a countertop adjacent said refrigerator.

20. The refrigerator as defined in claim 19 wherein said cabinet includes a door and said module is mounted to an outer surface of said door.

* * * * *